M. C. SCHWAB.
DEFLECTOR FOR GRAVITY CONVEYERS.
APPLICATION FILED APR. 23, 1908.
975,800.
Patented Nov. 15, 1910.
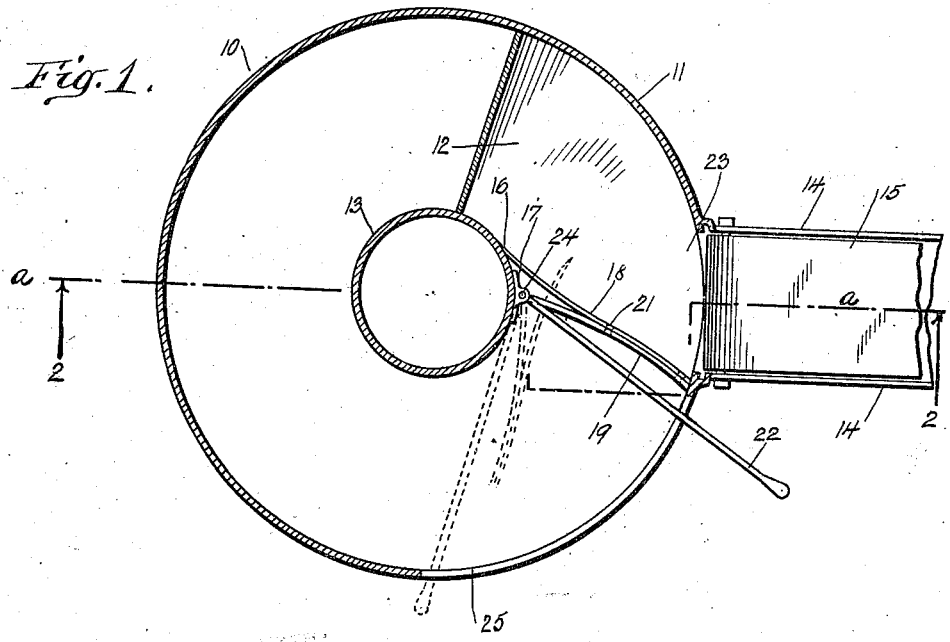
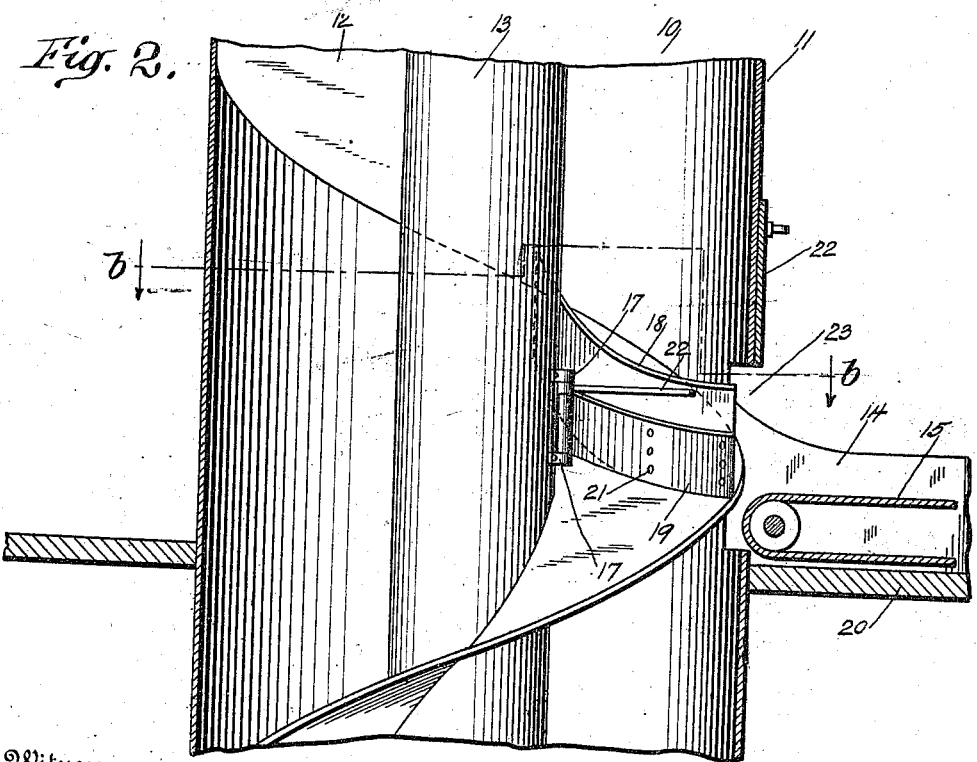

UNITED STATES PATENT OFFICE.

MARTIN C. SCHWAB, OF CHICAGO, ILLINOIS, ASSIGNOR TO GRAVITY CONVEYOR COMPANY, A CORPORATION OF NEW YORK.

DEFLECTOR FOR GRAVITY-CONVEYERS.

975,800.

Specification of Letters Patent. Patented Nov. 15, 1910.

Application filed April 23, 1908. Serial No. 428,793.

*To all whom it may concern:*

Be it known that I, MARTIN C. SCHWAB, a citizen of the United States, residing at Chicago, in the county of Cook and State of Illinois, have invented a new and useful Improvement in Deflectors for Gravity-Conveyers, of which the following is a specification.

My invention relates to certain new and useful improvements in gravity conveyers, and more particularly in gravity conveyers of the spiral type.

One object of my invention consists in the provision of means for deflecting articles from a conveying surface at any desired opening or discharge outlet.

A further object consists in providing a gravity conveyer with an efficient and novel form of deflector or switching device, whereby descending articles may be readily discharged from the conveyer at any desired opening therein whenever so desired.

Other objects will appear hereinafter, the novel combinations of elements being particularly pointed out in the subjoined claims.

These several objects are well accomplished by the construction illustrated in the accompanying drawings, wherein—

Figure 1 is a sectional plan view of a spiral gravity conveyer having my invention applied thereto the section being taken approximately on the line *b—b* of Fig. 2. Fig. 2 is a sectional elevation view of Fig. 1 taken approximately on the broken line *a—a* looking in the direction of the arrows 2—2.

Similar reference characters denote corresponding parts in both of the figures.

Referring to the drawing, 10 designates a well known type of spiral gravity conveyer comprising a circular outer shell or casing 11, and an inner tubular core 13, between which is securely fastened a spiral conveying surface or blade 12 upon which articles are adapted to slide from a higher to a lower level.

23 designates an opening in the conveyer casing 11 through which articles may be discharged at a floor landing, such as 20. A positively driven conveyer belt 15 may be arranged at a floor landing, by means of which articles are conveyed away from the conveyer opening to any desired distributing point. Guides 14, 14 are provided for the conveyer belt 15 to prevent articles falling therefrom during transmission. The opening 23 is provided with a sliding door 22 which may be used to close the opening when the same is not in use, and, while the opening 23 is herein described as a discharge opening, it could, if so desired, be used as an inlet opening, in which case the upper surface of the conveyer belt 15 would preferably be driven toward the conveyer, so that articles being transported thereon would be conveyed onto the spiral blade 12 and hence descend by gravity in the usual manner.

Pivoted to the inner tube or core 13 at a point substantially opposite the opening 23 is a switching or deflecting device whose function is to divert any articles which may be descending in the conveyer 10 out of the opening 23 and onto the belt conveyer 15. This switching device comprises a hinged plate 19 which is pivoted upon a pin 24 secured to brackets 17, 17 upon the core 13. Attached to the hinged plate 19 by means of rivets 21, or other fastening, is a deflector 18 which is preferably made longer and somewhat higher than the hinged plate 19, and is arranged so that it engages the surface of the core 13 at the point 16, the edge of the deflector where it meets the core 13 being chamfered so as not to present to descending articles any sharp edges or projections. A handled lever 22 is also pivoted at the hinge pin 24 and is securely fastened to the hinged plate 19 and moves therewith. This lever extends through a horizontally arranged slot 25 in the outer conveyer casing 11 for some distance, so as to be within easy reach of the operator when it is desired to manipulate the switching device. A catch (not shown) may be used to hold this lever against accidental movement. It will be noticed that the lower bracket 17 is located on the core 13 at a point somewhat removed from the spiral blade 12 in a vertical direction. This is for the purpose of allowing a free and unobstructed passage at all points past the switch device when the latter is moved into its inoperative position, as shown by broken lines in Fig. 1, by means of the lever 22. The deflector 18 is so shaped that when it is in operative position, that shown in full lines on the drawing, its lower edge will engage the spiral blade throughout its entire length so that descending articles upon meeting the deflector will be guided thereby out of the opening 23 without any possibility of being caught or jammed between the spiral blade and the deflector. In nearly every instance it is preferable to construct the switching device substantially as shown, that is to say, one having a hinged plate and a separate deflector plate connected thereto, since this arrangement provides an unobstructed passage for articles at any point on the spiral conveying surface when the switching device is not in operation, as before pointed out.

If desired, the switching device could easily be arranged to be hinged upon the inner side of the conveyer casing adjacent the opening therein.

While I have shown my invention as applied to a single discharge opening or floor landing, it is to be understood that the same is applicable to any desired number of conveyer openings, whether the same are used as inlet or discharge openings, or both.

The conveyer itself is usually arranged to connect all floors of a building and the basement, so that articles introduced into the spiral conveyer at any opening therein would automatically descend by gravity and be discharged at the basement or any desired intermediate opening or floor landing. The belt conveyer 15 may also be used at any or all of the conveyer openings, but, although the same is a great convenience when it is desired to handle a large number of articles with despatch, it is not essential to the proper operation of my invention.

While I have shown and described a preferred form of my invention in connection with a conveyer of well known type, I do not desire to be limited to the precise construction and arrangement of parts herein shown, since it is obvious that various changes and modifications could readily be made by those skilled in the art without departing from the spirit and scope of my invention.

Therefore, what I claim as new and desire to have protected by Letters Patent of the United States is:—

1. In a conveyer, the combination with a casing, of a core therein, an inclined conveying surface between the core and casing, and a deflector plate having a hinge connection intermediate its ends to the core.

2. In a conveyer, the combination with a casing formed with an opening therein, of a core within the casing, an inclined conveying surface between the core and casing, and a deflector plate having a hinge connection intermediate its ends to the core and movable into position to deflect articles from said surface out of the opening.

3. In a conveyer, the combination with a casing, of a core, a conveying surface, and a deflector hinged intermediate its ends and movable into position to extend from the core to the casing.

4. In a conveyer, the combination with a vertical casing formed with a discharge opening therein, of a core, a spiral conveying surface, and a vertically disposed deflector plate hinged intermediate its ends and movable into position with its inner edge in contact with the core and its outer edge in contact with the casing at the side of said opening.

5. In a conveyer, the combination with a casing, of a core, a conveying surface, a deflector plate having a hinge connection intermediate its ends to the core, and an operating arm extending from the hinge to a point outside the casing.

6. In a conveyer, the combination with an outer shell formed with an opening, of a central core, a spiral conveying surface between said parts, a supporting plate connected to the core by a vertical hinge, and a deflecting plate secured to said supporting plate and movable into position to guide articles toward said opening.

7. In a conveyer, the combination with an outer shell formed with a lateral opening therein, of a central core, an endless spiral conveying surface extending through the shell, a supporting member connected to the core by a vertical hinge spaced apart from the conveying surface, a vertically disposed deflecting plate secured to said supporting member and movable into and out of position with its lower edge in contact with the conveying surface and extending from the central core to the outer edge of said surface adjacent said opening, and means for moving said deflecting plate.

8. In a conveyer, the combination with an outer shell or casing having an opening therein, of an inner core, a spiral conveying surface between said parts, and a deflector connected by a vertical hinge within the casing to one of said parts adjacent the opening.

9. In a conveyer, the combination with an outer shell having an opening therein, of a central core, a spiral conveying surface, a deflecting device connected to the core by a vertical hinge and movable into and out of position to deflect articles moving down said surface to said opening.

10. In a conveyer, the combination with a core, of a conveying surface surrounding the core, and a deflector hinged to the core.

11. In a conveyer, the combination with a core, of a spiral conveying surface surrounding the core, and a deflector connected to the core by a vertical hinge.

In testimony whereof, I have signed my name to this specification in the presence of two subscribing witnesses.

MARTIN C. SCHWAB.

Witnesses:
CARL P. SCHROEDER,
THEODORE VLADIMIROFF.